United States Patent [19]

Walk

[11] 3,768,935

[45] Oct. 30, 1973

[54] CONTINUOUSLY ADJUSTABLE TRANSMISSION

[75] Inventor: Georg Walk, Rheydt, Germany

[73] Assignee: A. Monforts, Monchengladbach, Germany

[22] Filed: Nov. 29, 1971

[21] Appl. No.: 202,828

[30] Foreign Application Priority Data
Dec. 1, 1970  Germany............... P 20 59 011.8

[52] U.S. Cl. .................................................. 418/34
[51] Int. Cl............................. F01c 1/00, F03c 3/00
[58] Field of Search............................. 418/34, 33; 123/8.47

[56] References Cited
UNITED STATES PATENTS

| | | | |
|---|---|---|---|
| 1,367,591 | 2/1921 | Duncombe | 418/34 X |
| 2,304,406 | 12/1942 | Griffith | 418/34 X |
| 3,396,632 | 8/1968 | Leblanc | 123/8.47 |

Primary Examiner—Carlton R. Croyle
Assistant Examiner—Richard E. Gluck
Attorney—Arthur E. Wilfond et al.

[57] ABSTRACT

Continuously adjustable transmission assembly for directly transforming a force, hydraulically or pneumatically transmitted through a pressure medium, into rotary motion of a shaft, including at least two rotary piston motors operatively connected to the rotary shaft and actuable by the pressure medium for alternately driving the shaft, the rotary piston motors each including a rotor and a stator, both of the rotors being coupled to the rotary shaft and thereby to one another, and stepwise acting auxiliary transmission means coupling each of the rotors to its respective stator so that the respective stator is stationary during a work cycle of the respective rotor, and rotates faster than the rotor during an idling cycle of the rotor so as to overtake the rotor.

3 Claims, 10 Drawing Figures

Patented Oct. 30, 1973
3,768,935
3 Sheets-Sheet 1
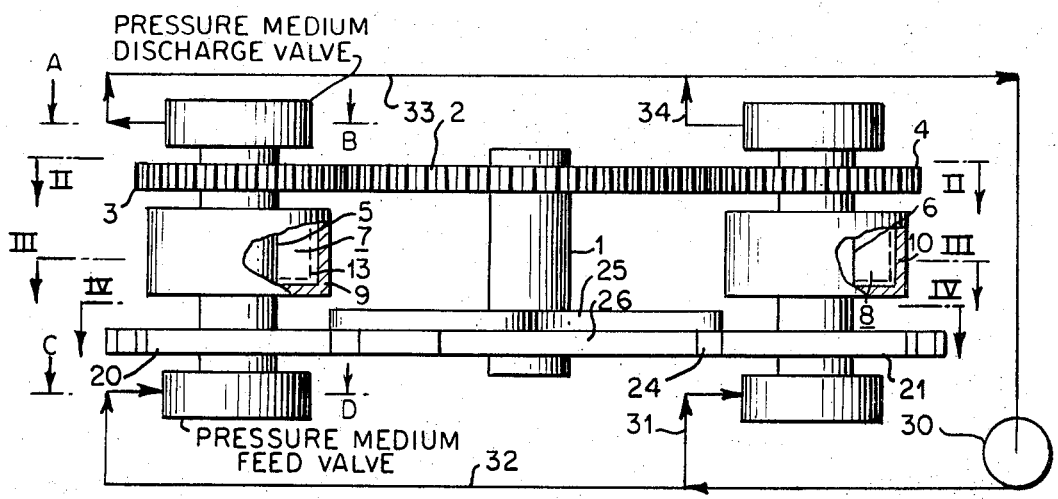
Fig.1
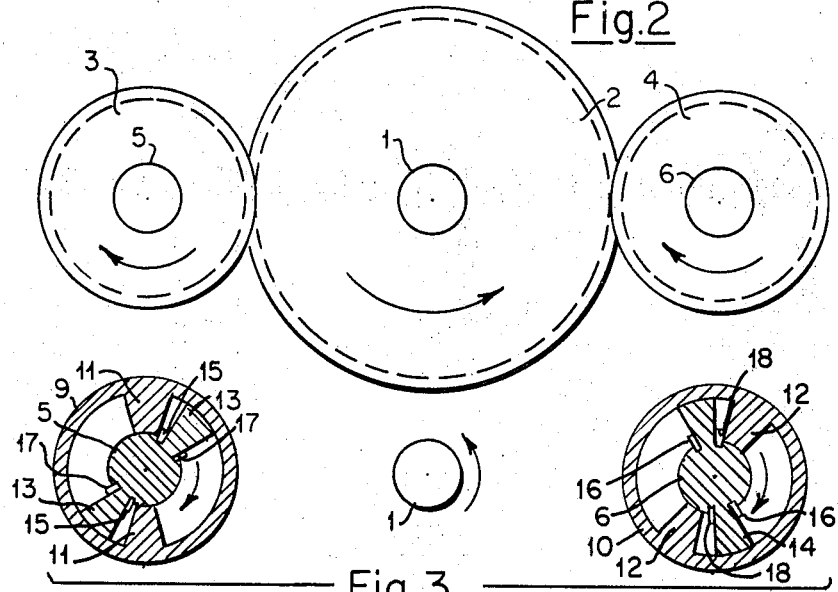
Fig.2
Fig.3
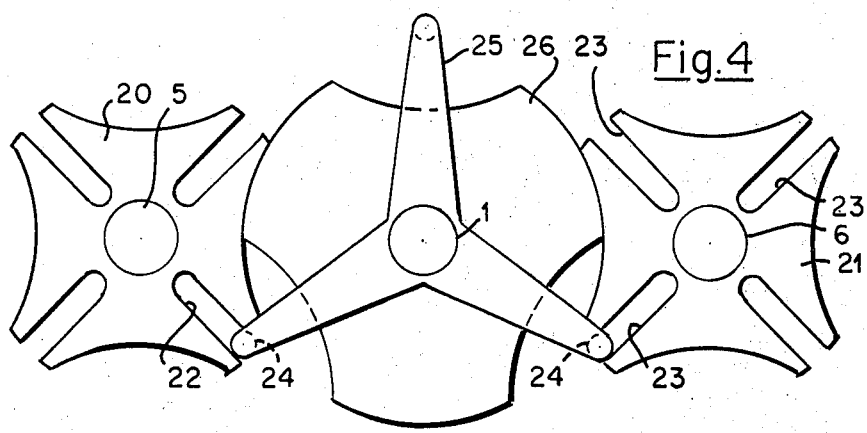
Fig.4

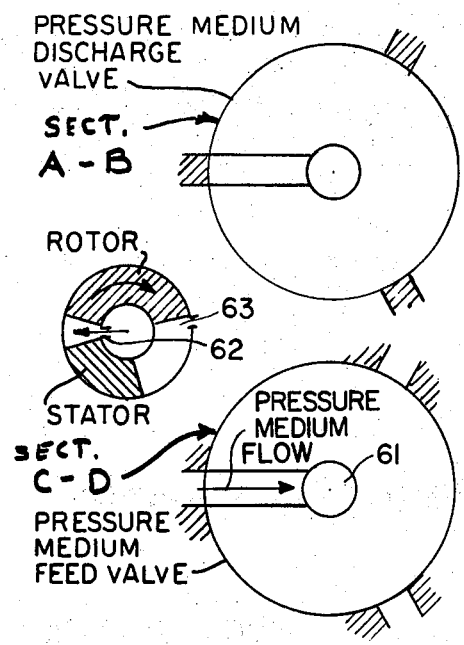
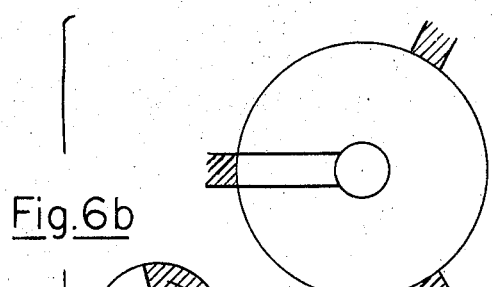
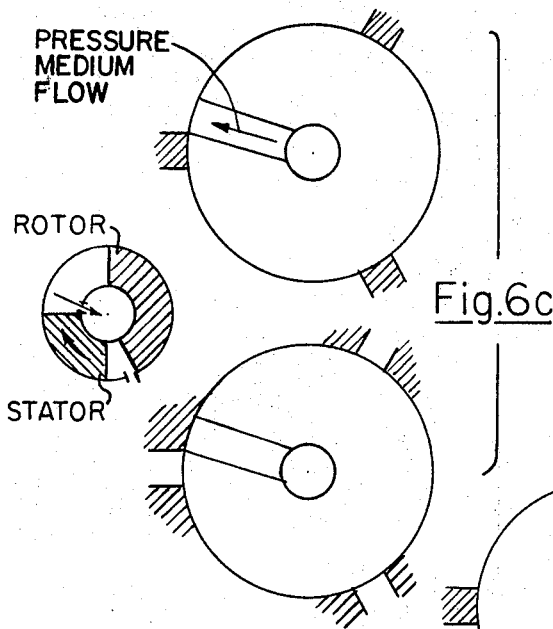
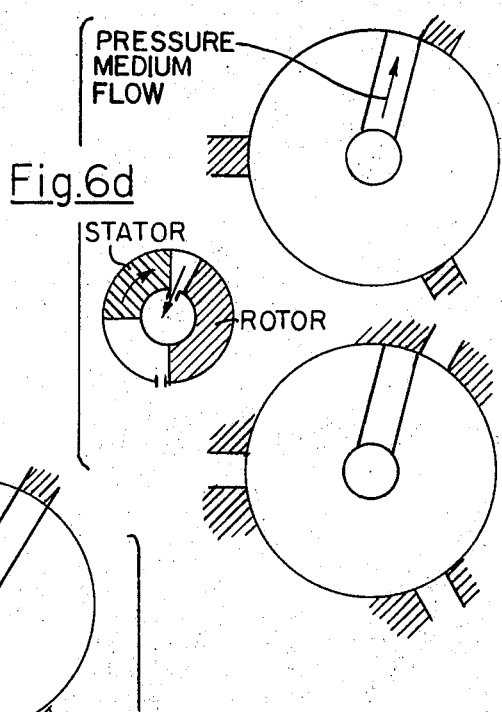
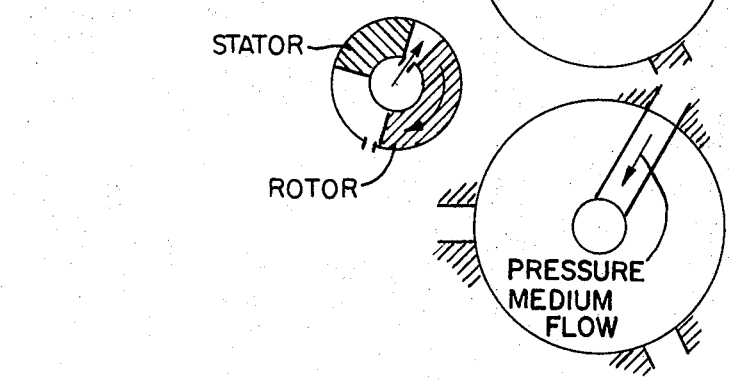

CONTINUOUSLY ADJUSTABLE TRANSMISSION

The invention relates to a continuously or steplessly adjustable transmission assembly for directly transforming a force (energy), which is transmitted fluidically, i.e., hydraulically or pneumatically, through a pressure medium, into rotary motion of a shaft.

Transmissions with continuously rotating hydraulic motors of conventional design have too little power output for many applications. While it is possible, theoretically, to increase the power output of such known transmissions having continuously rotating hydraulic motors, the sound level of such motors would then become so high that the motors would be banned as not complying with applicable legal regulations. The so-called Böhringer-Sturm transmission is moreover known (note: Hydraulische Antriebe by A. Dürr and O. Wachter, Carl Hauser-verlag, Muncih, 1949, pages 69 – 74), however, for many applications the coupling between the driving and the driven members in this transmission is too soft, this transmission being therefore unstable for a varying load.

It is accordingly an object of the invention to provide continuously adjustable transmission assembly for directly transforming a force, hydraulically or pneumatically transmitted through a pressure medium, into rotary motion of a shaft, which avoids the aforementioned disadvantages of the heretofore known transmission of this general type.

With the foregoing and other objects in view, there is provided, in accordance with the invention, continuously adjustable transmission assembly for directly transforming a force hydraulically or pneumatically transmitted through a pressure medium, into rotary motion of a shaft, comprising at least two rotary piston motors operatively connected to the rotary shaft and actuable by the pressure medium for alternately driving the shaft, the rotary piston motors each comprising a rotor and a stator, both of the rotors being coupled to the rotary shaft and thereby to one another, and stepwise acting auxiliary transmission means coupling each of the rotors to its respective stator so that the respective stator is stationary during a working cycle of the respective rotor, and rotates faster than the rotor during an idling cycle of the rotor so as to overtake the rotor.

In the rotary piston motor employed in the transmission assembly of the invention in principle at least, one displacement vane of the rotor can rotate in the cylinder space between the rotor shaft and the cylindrical wall of the stator. In this annular space, however, in order to form the working space for the pressure medium, at least one abutment is disposed, rigidly connected with the cylindrical wall which would, of itself, prevent a continuous rotation of the motor. Such rotary piston motors are employed as oscillating motors, turning drives and the like, because they are intrinsically suited only for reciprocatingly displacing a mass connected to the motor. In the present case, these motors are employed atypically, mainly to produce a continuous or constant rotary motion, the direction of rotation being also reversible, however. Except for this reversal of direction, the rotor is acted upon by the pressure medium, according to the invention, always only from one side, during the operating cycle of the rotor. This operating phase is then always followed by an idling phase during which, however, the rotor continues to turn. The idling phase occupies the time approximately in which, for a typical use of the motor, the rotor would be returned, in most cases, in one operating stroke, in the reversed direction. The use of this motor according to the invention, is possible because the stator is not held stationary continuously, but only during the work cycle of the rotor, and it is caused to follow the rotor rapidly during the idling phase of the latter so that the rotor can turn again through one stroke, during the next work cycle.

An example of such hydraulically or pneumatically driven rotary piston-motors is the so-called (high pressure) rotary piston-work cylinder which is provided per se for producing a reciprocating oscillatory motion of the drive shaft (note, for example, VDI Zeitschrift 103, 1961, page 917).

Such rotary piston-work cylinder, in principle, is formed of the rotary piston or the rotor, which is rotatable in the stator and is connected with the output shaft. The stator is formed of a cylindrical capsule from the inner wall of which an abutment which defines the piston displacement, projects into the cylinder space. Furthermore, a pressure medium inlet and outlet extend into this capsule. A rotary piston-work cylinder with one piston and one abutment could, in itself, execute an oscillator displacement of only less than 360°. If a rotary piston-work cylinder with two pistons and two abutments are employed, the maximum range of oscillation would be less than 180°. In the case of three pistons and three abutments, the range of oscillation would be less than 120°, and so on. Since, in using the invention, the stator (and therefore the abutment) is, however, always caused to follow the rotor rapidly, when it is idling, continuous rotary motion in one direction can be achieved.

According to the invention, the rotor is furthermore always connected with the output shaft of the transmission. The rotor of at least another rotary piston-motor is simultaneously coupled to this output shaft. If the rotor work cycles of the various rotary piston motors are arranged so that one rotor work cycle always directly follows the work cycle of another rotor, a uniform drive of the output shaft is attained for constant rate of feed of pressure medium. Since the rotors are furthermore all connected to each other, they, too, turn continuously in one direction, regardless of whether a work cycle of an idling cycle exists for the individual rotor.

It is therefore essential that the stators are caused to follow the rotary piston during the respective idling phase of the rotor. According to the invention, a stepwise-acting auxiliary transmission is provided for this purpose. This can be constructed, for example, by employing the principle of a Maltese Cross transmission. Of course, it is advisable to construct this auxiliary transmission so that is is not only self-blocking and impact-free, but also free of jolts in order to avoid wear and to assure smooth running of the output shaft of the transmission according to the invention.

According to a further embodiment of the invention, the control of the pressure medium feed and discharge valves of the rotary piston motor is effected in forced dependence upon the angular position of such rotary piston proper. This can be accomplished, for example, by means of hydraulic or pneumatic follow-up control wherein the pressure medium feed and discharge valves are opened and closed mechanically by accompanying rings with suitable openings or a coupled control shaft, in forced dependence upon the mutual angular position of the rotor and the stator.

The speed of the output shaft of the new transmission of the invention depends only upon the quantity or rate of pressure medium fed to the rotary pistons. The speed of rotation of the shaft is therefore adjustable at will and continuously or infinitely, i.e., steplessly, solely by regulating the quantity of pressure medium supplied per unit time, it being furthermore advantageous that the power at the output shaft be independent of the speed of rotation. The face that the rotary piston motors used according to the invention are actuable by the pressure medium in both rotary directions can furthermore be employed for reversing the direction of rotation of the output shaft of the new transmission of the invention.

While the foregoing explanations apply primarily to hydraulic drives, it is self-evident, however, that the drive can be constructed in principle in the same manner if it is to be actuated pneumatically.

Other features which are considered as characteristic for the invention are set forth in the appended claims.

Although the invention is illustrated and described herein an embodied in continuously adjustable transmission, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which:

FIG. 1 is a diagrammatic sectional view of an embodiment of the transmission according to the invention having two rotary piston-work cylinders;

FIGS. 2 to 4 are cross-sectional views of FIG. 1 taken respectively along the lines II — II, III — III and IV — IV in the direction of the respective arrows;

Figure 5:
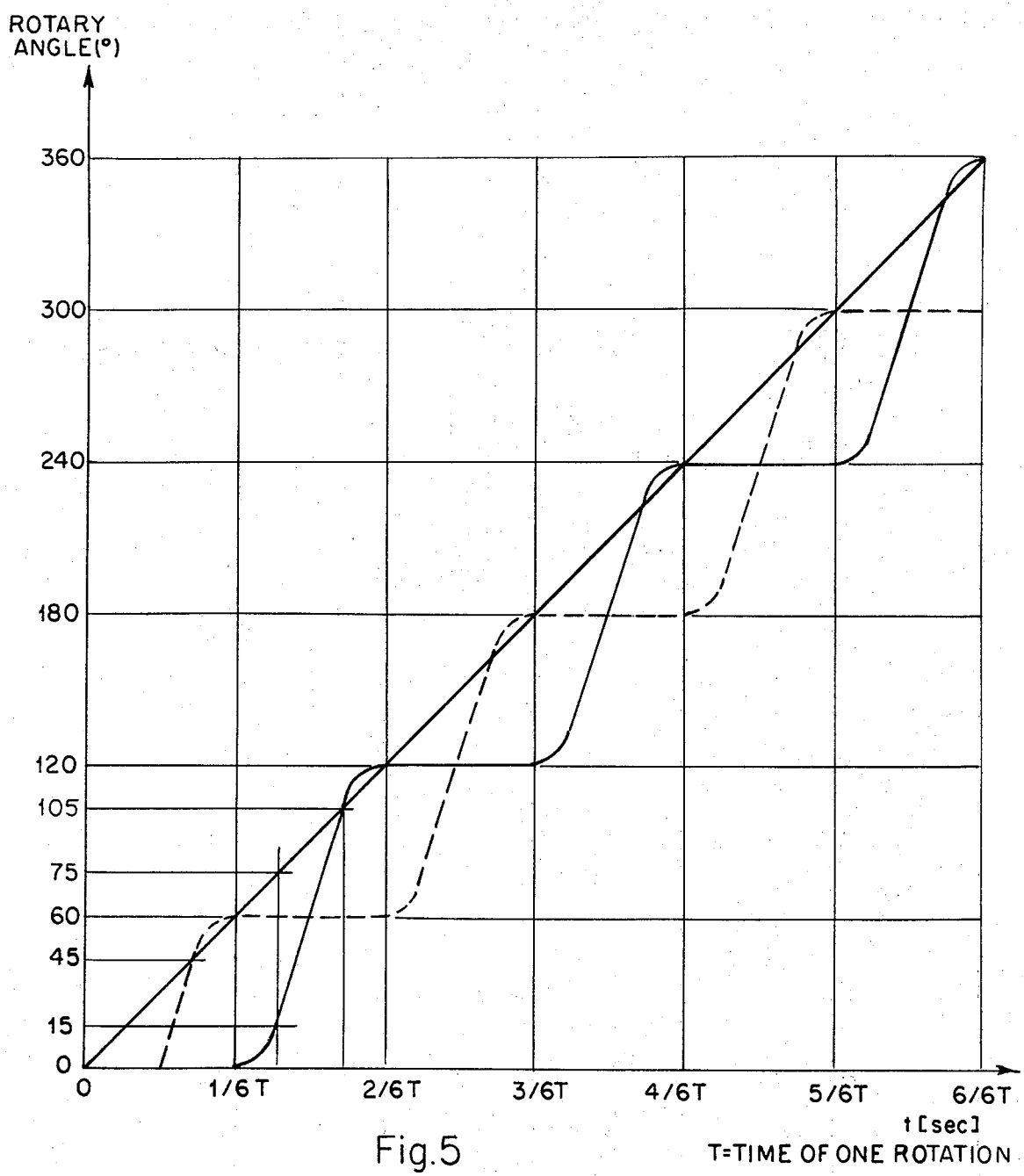

FIG. 5 is a plot diagram of the rotation of the rotors and stators with respect to time; and FIGS. 6a to 6e are diagrammatic cross-sectional views, respectively, of the pressure medium feed and discharge valves of the rotary piston-motors of the inventive transmission assembly, shown in different phases and accompanied by respective diagrammatic view of the rotor and stator of the rotary piston-motor associated therewith.

Referring now to the drawing and first, particularly to FIGS. 1 and 2 thereof, there is assumed therein that the output shaft 1 of the tramsmission is coupled by means of gear 2 to gears 3 and 4 which are mounted rigidly on rotary shafts 5 and 6 of two rotary piston-work cylinders 7 and 8. The stators of the rotary piston-work cylinders are formed in the embodiment (FIG. 3), of a respective cylindrical capsule 9, 10 with two stator vanes 11, 12 each, which project into the interior space of the capsule so far that with appropriate sealing only a negligibly small part of the pressure medium can pass through the gap between the ends of the stator vanes 11 and 12 and the shafts 5 and 6, respectively, of the rotor. The rotors themselves are formed of the rotor shafts 5 and 6, respectively, and (in accordance with the number of stator vanes) of the two rotor vanes 13 and 14, respectively, which are connected rigidly to the respective shafts, and project toward the respective inner walls of the capsules 9 and 10 so far that with appropriate sealing only a negligibly small part of the pressure medium can pass through the respective gaps between the cylinder wall of the respective capsule and the end of the respective vane. An embodiment having two rotor vanes and two stator vanes is assumed here; in principle, however, nothing changes if only one vane or if more than two vanes are used.

The rotor shafts 5 and 6 are, as a rule, of hollow construction, and accommodate the supply and discharge lines for the pressure medium. Furthermore, control shafts for the control of pressure medium valves ccan be provided in the hollow rotor shafts. In the use of the rotary piston-work cylinders according to the invention, the feeding and discharge of the pressure medium is advantageously effected from the hollow rotor shaft, because feeding and discharge thereof through the wall of the cylinder presented difficulties due to the rotation of the cylinder itself. In the illustrated embodiment pressure medium feeding and discharge valves 15 to 18 are indicated on both sides of the connecting surface of the respective rotor vanes 13 and 14 with the rotor shaft 5 or 6 associated therewith. For one rotary direction, the valves 15 and 16 are always used alternatingly for the feeding and discharge of pressure medium. The valves 17 and 18 are provided for the other rotary direction. The appertaining pressure medium lines are not shown and neither are the valve control means.

While the rotor shafts 5 and 6 are connected through gears to the output shaft 1, the stators, i.e., the cylinder capsules 9 and 10 as well as the stator vanes 11 to 12, are connected to one another and to the output shaft 1 through an auxiliary transmission according to FIGS. 1 and 4. It is hardly possible to illustrate in a drawing, because of their complex three-dimensional construction, suitable transmissions that operate stepwise and without jolts and impacts, and that are self-locking. Revolving detent mechanisms, such as wheel crank transmissions, for example, which exhibit no sudden increases or jumps in acceleration, are suitable, for example. These transmissions need not have a link to the output shaft 1, as is assumed in the following. Suitable auxiliary transmissions can rather operate also relative to the rotor and/or the stationary environment.

For the sake of simplicity, reference is being made in the following, however, to a Maltese Cross drive which, although not jolt-free, is nevertheless suitable, in principle. According to FIGS. 4 and 1, two driven crosses 20 and 21 are provided, each of which is rigidly connected to the associated stators 9, 11 and 10, 12, respectively. Rollers 24, successively engaging in slots 22 and 23, respectively, of the driven crosses 20 and 21, and which are carried by drive arms 25 (which are three in number in FIG. 4), are connected rigidly through a driver 26 with the output shaft 1. Through appropriate mutual coordination and construction of the drive crosses 20 and 21 and the drive element 26, it is possible that, with a correspondingly matched valve control of the rotary piston-work cylinder, the stator motion will be impeded or blocked (and therefore arrested) always just during the respective rotor-work cycle, and the stator is caused to follow the rotor rapidly during the subsequent rotor idling cycle.

In the illustrated embodiment only two rotary piston-work cylinders are shown. This is not to imply any limitation. Rather, it can be very advantageous, particularly for the synchronism and the moment of rotation or torque of the new transmission to employ three or moee rotary piston-work cylinders or rotary piston-motors, generally. The valve control for the pressure medium as well as the auxiliary transmission can then be fitted or accommodated to the required specifications by conventional means.

The circulation of the pressure medium is further shown, in principle, in FIG. 1. The pressure medium is delivered in desired quantity by a pump 30 and is fed to the rotary piston-work cylinders through the lines 31 and 32. After the pressure medium is discharged from the rotary piston-work cylinders, it travels back to the pump 30 through the lines 33 and 34. Possible leakage losses of the pressure medium are accounted for by the pump 30.

It must be emphasized that the rotary-piston motors 7 and 8 of the invention are not hydraulic or pneumatic motors of the conventional type. Rotary piston-motors (for example, high pressure rotary piston-work cylinders), can, in themselves, execute onl oscillatory motions, whereas only the stepwise acting auxiliary transmission of FIG. 4 makes it possible for the output shaft 1 to be driven continuously in accordance with the invention.

In the plot diagram of FIG. 5, angles of rotation for the rotors and stators are plotted as long the ordinate as a function of time shown along the absicissa and is believed to be self-explanatory.

FIGS. 6a to 6e show five successive cross sections of the pressure medium feed and discharge valves of the rotary piston-motors of the transmission system of the invention, associated with each pair of the valves, furthermore, is a diagram of the pertinent relative position of the rotor and stator of the rotary piston-motor for the particular phase or stage of the feed and dischage valves. Five instantaneous positions of the valve pairs and motors are shown. In the phases of FIGS. 6a and 6b, the pressure medium feed valve is open. In the phases of FIGS. 6c to 6e, the discharge valve is open and the feed valve is closed. The phase shown in FIG. 6e already forms the beginning of the next cycle in which the feed valve is again open and the discharge valve is closed.

Referring more particularly to FIGS. 6a and 6e, the pressure inlet and outlet valves are both intended for the space in front of the stator. The space of the rotor, on the other hand, may simply be regarded to be open. The drawn embodiment example emanates from the fact that the rotor and stator rotate only in one direction. In this case, the space in front of the rotor can be simply imagined as being open, since the pressure medium does not enter this space.

The pressure medium is delivered to the space in front of the stator in the embodiment example, through the hollow axle 61. Through an opening 62, he pressure medium arrives in the space in front of the stator. Since the stator is retained in the phase according to FIGS. 6a and 6b, the introduction of the pressure medium through opening 62, into the space in front of the stator, drives the rotor forward. At the same time, the space in front of the rotor empties through the opening 63. This opening 63 is provided in the example in the outer wall of the working cylinder, immediately ahead of the forward front of the rotor body. As a result, the opening remains open during the entire rotor movement. When the rotor has moved into the position according to FIGS. 6b or 6c, the stator is quickly made to follow the rotor, according to FIGS. 6c, and FIG. 6d. Thereby the pressure medium escapes from the space ahead of the stator and, simultaneously, a filling medium is sucked into the space ahead of the rotor, such as, for example, a gas or an oil, from an appropriate reservoir. The space ahead of the rotor is of no importance for the drive. The movement of the stator is not effected by a pressure medium supplied to the working cylinder, shown in FIG. 6, but, rather, by a gear which is driven by one of the other working cylinders of the device of the present invention.

Basically, of course, the opening 63 in front of the rotor can also be provided for the in- and outlet of pressure mediums, particularly if the working cylinder is to be functionable in both rotary directions.

I claim:

1. Continuously adjustable transmission assembly for directly transforming a force, hydraulically or pneumatically transmitted through a pressure medium, into rotary motion of a shaft, comprising at least two rotary piston motors operatively connected to the rotary shaft and actuable by the pressure medium for alternately driving the shaft, said rotary piston motors each comprising a rotor and a stator, both of said rotors being coupled to the rotary shaft and thereby to one another, and stepwise acting auxiliary transmission means coupling each of said rotors to its respective stator so that the respective stator is stationary during a work cycycle of the respective rotor, and rotates faster than the rotor during an idling cycle of the rotor so as to overtake the rotor.

2. Continuously adjustable transmission assembly according to claim 1 including means for controlling pressure medium feed and discharge at said rotary piston-motors, said controlling means being forcibly dependent upon mutual positions of the respective rotors and stators.

3. Continuously adjustable transmission assembly according to claim 1 wherein rotary piston-work cylinders are employed as said rotary piston-motors.

* * * * *